(12) United States Patent
Veen et al.

(10) Patent No.: US 8,942,892 B2
(45) Date of Patent: Jan. 27, 2015

(54) HAPTIC FEEDBACK SYSTEM FOR VEHICLE SEATING

(75) Inventors: Gerald R. Veen, Holland, MI (US); William M. Jarocha, South Lyon, MI (US)

(73) Assignee: Johnson Controls Technology Company, Holland, MI (US)

( * ) Notice: Subject to any disclaimer, the term of this patent is extended or adjusted under 35 U.S.C. 154(b) by 0 days.

(21) Appl. No.: 13/510,879

(22) PCT Filed: Nov. 15, 2010

(86) PCT No.: PCT/US2010/056718
§ 371 (c)(1),
(2), (4) Date: May 18, 2012

(87) PCT Pub. No.: WO2011/062869
PCT Pub. Date: May 26, 2011

(65) Prior Publication Data
US 2012/0226418 A1 Sep. 6, 2012

Related U.S. Application Data

(60) Provisional application No. 61/262,325, filed on Nov. 18, 2009.

(51) Int. Cl.
*G06F 19/00* (2011.01)
*B60N 2/44* (2006.01)
*B60N 2/20* (2006.01)
*B60N 2/02* (2006.01)
*B60W 50/16* (2012.01)

(52) U.S. Cl.
CPC ............ *B60N 2/0276* (2013.01); *B60N 2/0232* (2013.01); *B60N 2/448* (2013.01); *B60W 50/16* (2013.01); *B60N 2002/4485* (2013.01)
USPC ......................... 701/49; 340/407.1; 297/217.3

(58) Field of Classification Search
USPC .......................................... 701/49; 340/407.1
See application file for complete search history.

(56) References Cited

U.S. PATENT DOCUMENTS

| 5,751,129 A * | 5/1998 | Vergin ........................ 318/467 |
| 2005/0110348 A1 | 5/2005 | Hijikata |
| 2011/0001616 A1* | 1/2011 | Nathan et al. ................. 340/438 |

FOREIGN PATENT DOCUMENTS

| EP | 1475066 A2 * | 11/2004 | ............ A61H 23/02 |
| EP | 1927513 A1 | 6/2008 | |
| FR | 2899172 A1 * | 5/2007 | ............ B60K 28/02 |
| FR | 2899172 A1 | 10/2007 | |
| JP | H07304358 | 11/1995 | |
| JP | H11169258 A | 6/1999 | |

(Continued)

OTHER PUBLICATIONS

Machine Translation of FR 2899172 A1, published on May 10, 2007.*

(Continued)

*Primary Examiner* — James Trammell
*Assistant Examiner* — Brian P Sweeney
(74) *Attorney, Agent, or Firm* — Fletcher Yoder, P.C.

(57) ABSTRACT

A vehicle seating system includes a vehicle seat and a seat control motor coupled to the vehicle seat. The seat control motor is configured to move the vehicle seat to an occupant-desired position. The vehicle seating system also includes a controller communicatively coupled to the seat control motor. The controller is configured to output a signal to the seat control motor to induce a vibration within the vehicle seat.

12 Claims, 4 Drawing Sheets

(56) References Cited

FOREIGN PATENT DOCUMENTS

| JP | 2000020900 A | * | 1/2000 |
|---|---|---|---|
| JP | 2008-141477 | | 6/2008 |
| KR | 1019980072531 | | 11/1998 |
| KR | 20080031437 | | 4/2008 |

OTHER PUBLICATIONS

Machine Translation of JP 2000020900 A, published on Jan. 21, 2000.*

International Search Report and Written Opinion mailed Feb. 22, 2011 in PCT/US2010/056718 (12 Pgs).
Costlow, T., "Sitting Comfortably", 54, Jan. 2009 aei (aei-online.org).
Korean Office Action dated Dec. 19, 2013.
Chinese Office Action dated Jan. 27, 2014.
Korean Office Action dated May 29, 2014.
European Office Action dated Jun. 10, 2014.
Chinese Office Action mailed Sep. 12, 2014 for Application No. 201080056596.7.

* cited by examiner

US 8,942,892 B2

HAPTIC FEEDBACK SYSTEM FOR VEHICLE SEATING

CROSS REFERENCE TO RELATED APPLICATION

This application claims priority from and the benefit of U.S. Provisional Application Ser. No. 61/262,325, entitled "HAPTIC FEEDBACK SYSTEM FOR VEHICLE SEATING", filed Nov. 18, 2009, which is hereby incorporated by reference in its entirety.

BACKGROUND

The invention relates generally to a haptic feedback system for vehicle seating.

Certain vehicle seats are configured to vibrate to alert a driver of various detected conditions. For example, if a vehicle drifts outside of a lane of traffic, an onboard computer may detect this condition and induce a vibration with the driver seat to warn the driver. This seat vibration functionality is generally known as haptic feedback, and may serve to alert a driver of lane departure, an approaching vehicle or obstacle, exceeding a speed limit, activation of a turn signal, low fuel level, crash avoidance, or other detected conditions. In certain haptic feedback systems, the vibrations are induced within the seat by one or more eccentric mass shakers. These shakers typically include an electric motor configured to rotate a mass positioned off-center from the motor rotation axis. Consequently, if the vehicle computer detects a predetermined condition (e.g., lane departure), the computer may engage the electric motor causing the eccentric mass shaker to vibrate the seat.

Unfortunately, due to the expense associated with such eccentric mass shakers, providing haptic feedback within a driver seat may significantly increase the cost of vehicle seating. Furthermore, the eccentric mass shakers may increase the weight of the vehicle, thereby decreasing performance and/or reducing fuel efficiency. Because typical eccentric mass shakers are only capable of vibrating at one frequency and amplitude, multiple shakers may be positioned throughout the driver seat to differentiate between various vehicle conditions. For example, one shaker may be positioned within a seat bottom to alert a driver of a first vehicle condition, while a second shaker is positioned within a seat back to alert the driver of a second vehicle condition. As will be appreciated, weight increases proportionally to the number of shakers employed. Consequently, typical haptic feedback systems may increase both the weight and production costs associated with vehicle seating.

BRIEF DESCRIPTION OF THE INVENTION

The present invention relates to a vehicle seating system including a vehicle seat and an existing seat control motor coupled to the vehicle seat. The seat control motor is configured to move the vehicle seat relative to a floor of a vehicle interior. The vehicle seating system also includes a controller communicatively coupled to the seat control motor. The controller is configured to output an oscillating voltage signal to the seat control motor to induce a vibration within the vehicle seat.

DRAWINGS

DETAILED DESCRIPTION

Figure 1:
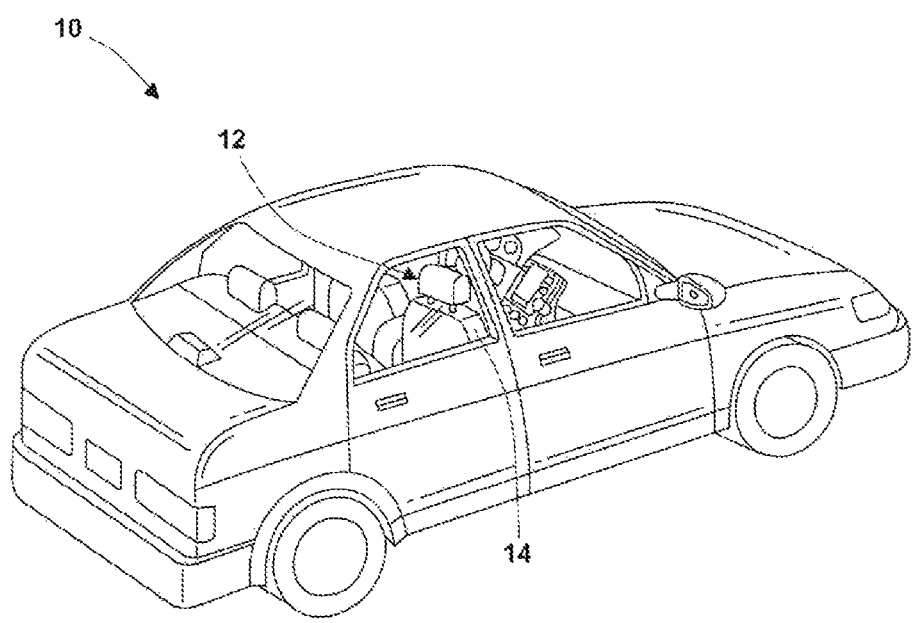
FIG. 1 is a perspective view of an exemplary vehicle that includes seats which may employ a haptic feedback system.

FIG. 1 is a perspective view of an exemplary vehicle 10 that includes seats which may employ a haptic feedback system. As illustrated, the vehicle 10 includes an interior 12 having seats 14. As discussed in detail below, certain seats 14 are configured to vibrate to alert a driver (and/or another occupant) of various vehicle conditions. In the present embodiments, the vibration is induced via seat control motors configured to move the seat 14 relative to a floor of the vehicle interior 12. Specifically, a controller communicatively coupled to the seat control motors is configured to output an oscillating voltage signal to the seat control motors, thereby inducing a vibration within the seat 14. The controller may also be configured to vary the driving frequency and/or provide the oscillating voltage signal via a series of pulsations to differentiate between various warnings. Because the present embodiments utilize existing seat control motors to provide haptic feedback, the expense and weight of the vehicle seating system may be reduced compared to configurations employing eccentric mass shakers.

In certain embodiments, the haptic feedback system may alert a driver of various vehicle conditions. For example, the vehicle 10 may include sensors configured to detect departure from a lane of traffic. If such a condition is detected, the haptic feedback system may alert the driver by inducing a vibration within the driver seat 14. In addition, the vehicle 10 may include sensors configured to detect an approaching object or vehicle. Upon detection, the haptic feedback system may alert the driver by providing a similar vibration. In certain embodiments, the vibration associated with lane departure, for example, may be different than the vibration associated with an approaching object or vehicle. For example, the controller may be configured to output a first frequency to indicate lane departure and a second frequency to indicate an approaching object or vehicle. Consequently, a driver may be able to identify the particular condition based on the sensed seat vibration. As will be appreciated, the haptic feedback system may also alert the driver of various other vehicle conditions, such as exceeding a speed limit, low fuel level, active turn signal, or additional vehicle conditions.

As discussed in detail below, certain seats 14 may include separate seat control motors to adjust the seating position. For example, certain seats 14 may include a seat control motor configured to adjust the longitudinal position of the seat with respect to the vehicle interior 12, the vertical position of the seat, the tilt of the seat bottom and/or the recline of the seat back. By selectively sending a signal to a particular seat control motor, the haptic feedback system may further differentiate between driver alerts. For example, if a low fuel condition is identified, the controller may drive a motor which controls vertical seat position, and if a lane departure is detected, the controller may drive a motor which controls seat back reclining. Because a driver may be able to distinguish between the different induced vibrations, the driver may be able to identify the particular vehicle condition. To further differentiate between driver alerts, the controller may be configured to selectively pulse the oscillating voltage signal to establish a "rhythm" within the seat 14. This rhythm may be varied based on a particular warning conveyed to the driver. Because the controller is capable of varying frequency, amplitude, pulses, and which seat control motor is driven, the present haptic feedback system may provide enhanced feedback to the driver compared to systems employing eccentric mass shakers.

In certain embodiments, the haptic feedback system may be utilized in conjunction with a driver information display. For example, if a low fuel level is detected, the haptic feedback system may alter the driver of the condition, while an instrument panel indicator illuminates. In further embodiments, the instrument panel may include a display configured to provide a textual or graphical indication of the detected condition. In such embodiments, if a vehicle condition (e.g., crash avoidance, lane departure, etc.) is detected, the haptic feedback system may activate to direct driver attention to the display. In this manner, the particular condition identified by the vehicle 10 may be clearly conveyed to the driver.

Figure 2:
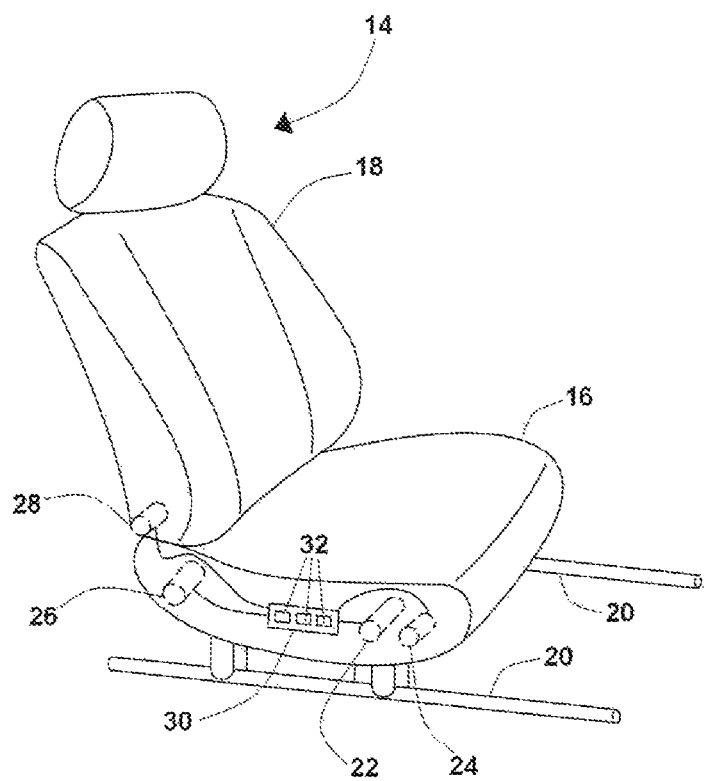
FIG. 2 is a perspective view of the seat shown in FIG. 1.

FIG. 2 is a perspective view of the seat 14 shown in FIG. 1. As illustrated, the seat 14 includes a seat bottom 16 and a seat back 18. The seat 14 is coupled to the floor of the vehicle 10 by rails 20. Seat control motors within a seat chassis are configured to move the seat 14 relative to the vehicle floor, e.g., along the rails 20. Specifically, a first seat control motor 22 is configured to translate the vehicle seat 14 in a longitudinal direction along the rails 20. Such position adjustment may facilitate accommodation of drivers of various heights. In addition, a second seat control motor 24 is provided to translate the vehicle seat 14 in a vertical direction relative to the rails 20 to further adjust driver seating position. A third seat control motor 26 is configured to tilt the seat bottom 16 relative to the floor of the vehicle interior 12, and a fourth seat control motor 28 is configured to rotate the seat back 18 relative to the seat bottom 16. As will be appreciated, certain vehicle seats 14 may include more or fewer seat control motors. For example, in certain configurations, a seat 14 may only include a seat control motor 22 configured to translate the seat in a longitudinal direction, and a seat control motor 28 configured to rotate the seat back 18 relative to the seat bottom 16. In further embodiments, the seat 14 may include additional motors configured to adjust a position of a lumbar support, a position of a head rest, and/or a position of other components within the vehicle seat 14. While the present embodiment employs internally commutated (e.g., brushed) direct current (DC) electric motors, it should be appreciated that alternative embodiments may employ brushless DC motors, alternating current (AC) motors, or any other suitable motor configuration.

In the present configuration, a control panel 30 including switches 32 is configured to provide control of the seat control motors 22, 24, 26 and 28. As discussed in detail below, the control panel 30 facilitates user input into a controller which adjusts seat position. For example, in certain embodiments, the controller may include a memory configured to store desired seating positions for multiple users. In such embodiments, the user may select a desired seating position on the control panel 30, and the controller will automatically instruct the seat control motors 22, 24, 26, and 28 to adjust the seat 14 to the desired position. While the control panel 30 is positioned on the side of the seat bottom 16 in the present embodiment, it should be appreciated that the control panel 30 may be positioned in other areas of the vehicle interior 12 in alternative embodiments.

In the present embodiments, one or more of the seat control motors 22, 24, 26 and 28 are configured to provide haptic feedback to the driver in addition to adjusting the position of the seat 14. Specifically, the controller is configured to provide an oscillating voltage signal to the motors 22, 24, 26 and 28 to establish a vibration within the seat 14. By selectively activating a certain seat control motor, the controller may be able to communicate a particular vehicle condition to the driver. For example, if a low fuel condition is identified, the controller may drive the first seat control motor 22 to establish a vibration within the seat bottom 16, and if a lane departure is detected, the controller may drive the fourth seat control motor 28 to establish a vibration within the seat back 18. Because the driver may be able to distinguish between these vibrations, the driver may be able to identify a particular vehicle condition. Because the present embodiments utilize existing seat control motors to provide haptic feedback to the driver, production cost and weight associated with vehicle seating may be reduced compared to haptic feedback systems that utilize eccentric mass shakers.

Figure 3:
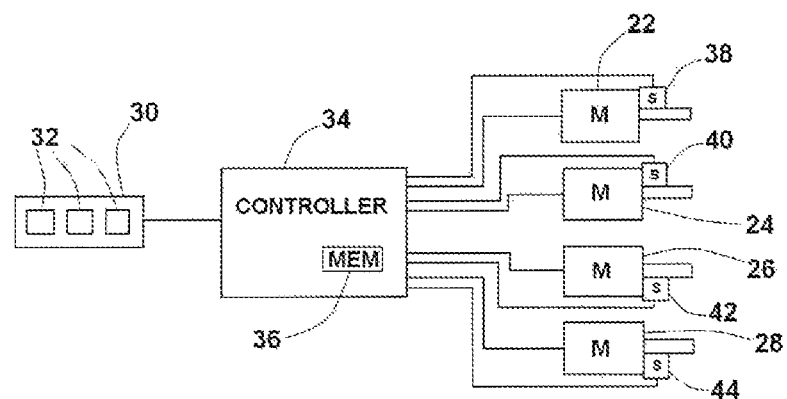
FIG. 3 is a schematic diagram of a first embodiment of the haptic feedback system including a controller configured to monitor the position of the seat.

FIG. 3 is a schematic diagram of a first embodiment of the haptic feedback system including a controller 34 configured to monitor the position of the seat 14. In the present embodiment, the controller 34 includes a memory 36 configured to store the position of the seat 14. Specifically, the controller 34 is configured to monitor the rotation of each seat control motor 22, 24, 26 and 28 to determine the seat position and to store the seat position within the memory 36. As illustrated, a first seat control motor 22 includes a first memory position sensor 38. The memory position sensor 38 is configured to monitor the rotation of the motor 22 and to send a signal to the controller 34 indicative of rotation. For example, in certain configurations the memory position sensor 38 may be a Hall effect sensor configured to monitor the rotation of the magnetic field emanating from the motor 22 to determine motor rotation. Similar sensors 40, 42 and 44 are coupled to the second, third and fourth seat control motors 24, 26 and 28, respectively. As will be appreciated, alternative embodiments may employ other sensor configurations, such as sensors positioned along the motor driveline and/or sensors located within the controller 34 that measure current flow to the motors (e.g., pulse commutation sensing) to monitor motor rotation. By monitoring the rotation of each motor 22, 24, 26 and 28, the controller 34 may accurately determine the position of the seat 14, and store the position within the memory 36. Consequently, when a user selects a desired seating position, the controller 34, via communicative coupling with the seat control motors, may automatically adjust the seat to the desired position.

In the illustrated embodiment, the controller 34 includes a switching network configured to operate the motors 22, 24, 26 and 28 based on the stored position of the seat 14. As will be appreciated, the switching network enables the controller 34 to rotate each seat control motor in a desired direction based on the stored seat position and/or input from the control panel 30. The switching network may also provide the seat control motors 22, 24, 26 and 28 with a signal that causes the motors to induce a vibration within the seat 14. As discussed in detail below, the controller 34 may output an oscillating voltage signal to the seat control motors 22, 24, 26 and 28. For example, the controller 34 may send a signal to the first motor 22 instructing the first motor to rotate in a first direction. The controller 34 may then send a signal to the first motor 22 instructing the first motor to rotate in the opposite direction. By rapidly switching motor directions, the first motor 22 may induce a vibration within the seat 14. For instance, if the controller 34 switches the direction of motor rotation 100 times per second, a 100 Hz vibration may be established within the seat 14. In the present embodiment, the controller 34 may be capable of switching motor rotation direction at a frequency of approximately between 1 Hz to 20,000 Hz. As previously discussed, a similar signal may be sent to the other seat control motors 24, 26 and 28 to induce similar vibrations within the seat 14.

As the seat control motors 22, 24, 26 and 28 rapidly vary direction, the sensors 38, 40, 42 and 44 continuously monitor the rotation of the motors. This rotation information is output to the controller 34 which tracks variations in seat position. In certain embodiments, the controller 34 may be configured to continuously adjust the output signal to the motors based on input from the sensors. For example, the controller 34 may induce a vibration in the vertical direction by outputting an oscillating voltage signal to the second seat control motor 24. Due to the weight of the driver within the seat 14, the seat 14 may be biased toward a downward position. Therefore, the seat 14 may move a slightly greater distance during the downward motion than during the upward motion. As a result, once the seat vibration has terminated, the seat 14 may be positioned lower than its initial position, thereby resulting in a potentially undesirable seating position for the driver. Consequently, in certain embodiments, the controller 34 may vary the degree of motor rotation in each direction based on input from the sensors. For example, if the sensor 40 determines that the seat 14 is moving a greater distance in the downward direction than in the upward direction during each vibration cycle, the controller 34 may compensate by instructing the motor 24 to move the seat 14 slightly upward during each cycle. In this manner, after the vibration is complete, the seat 14 may be positioned at a substantially similar location to the initial seating position.

In an alternative embodiment, the controller 34 may store the position of the seat 14 within the memory 36 prior to inducing a vibration. The controller 34 may then automatically return the seat 14 to the stored position after the vibration is complete. In this manner, the net position of the seat 14 will remain substantially constant. As previously discussed, the controller 34 may also periodically engage and disengage the vibration to establish a series of pulses within the seat 14. Based on the pulse frequency and duration, the controller 34 may alert the driver of various vehicle conditions. Furthermore, the frequency of the vibration may be varied to facilitate identification of a particular vehicle condition. In this manner, the driver may be able to differentiate between detected vehicle conditions based on the sensed vibration within the seat.

Figure 4:
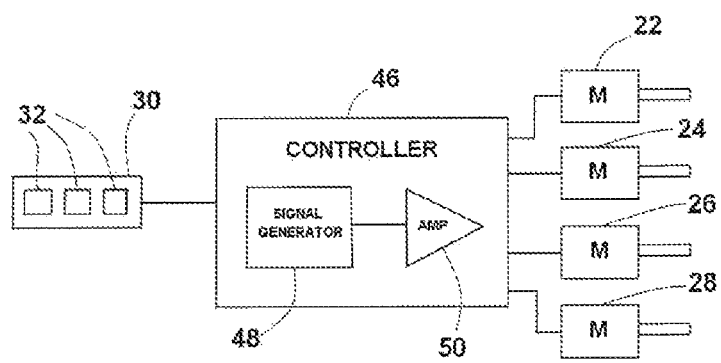
FIG. 4 is a schematic diagram of a second embodiment of the haptic feedback system including a controller having a signal generator and amplifier which drive the seat control motors.

FIG. 4 is a schematic diagram of a second embodiment of the haptic feedback system including a controller 46 having a signal generator 48 and an amplifier 50 to drive the seat control motors 22, 24, 26 and 28. As illustrated, the present embodiment does not include the memory position sensors shown in FIG. 3. Consequently, the controller 46 does not track or store the position of the seat 14 as the seat moves relative to the floor of the vehicle 10. In such a configuration, a driver may directly control seating position by providing input via switches 32 on the control panel 30. Because the controller 46 does not include the switching network, the controller 46 utilizes the signal generator 48 and amplifier 50 to generate the oscillating voltage signal which drives the seat control motors 22, 24, 26 and 28. In certain configurations, the signal generator 48 is configured to output a sine wave which drives the motors in alternating directions. The amplifier 50 is configured to amplify the signal from the signal generator 48 to provide the motors with a sufficient amplitude to induce a vibration within the seat 14. The signal generator 48 may be configured to output a signal having a frequency ranging from approximately 1 Hz to 20,000 Hz. As previously discussed, a certain frequency may be selected to indicate a particular vehicle condition. In addition, the signal generator 48 and/or the controller 46 may be configured to deliver the signal to the motors in pulses to establish a rhythm of vibrations. Furthermore, the controller 46 may direct the signal to different seat control motors 22, 24, 26 and/or 28 to further facilitate differentiation between driver alerts.

Similar to the previously described controller 34, the controller 46 may be configured to ensure that the seat position after vibration is substantially similar to the seat position before vibration. Specifically, the controller 46 may be configured to monitor the output from the signal generator 48 and to determine the first direction of rotation during a period of vibration. The controller 46 may then instruct the signal generator 48 to terminate vibration after rotation in the opposite direction. Such a configuration may substantially reduce the possibility of variations in seat position during vibration.

Figure 5:
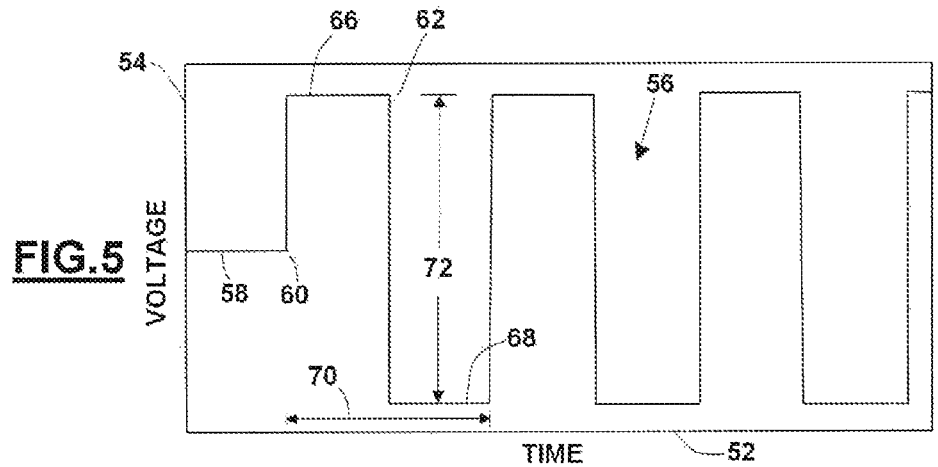
FIG. 5 is a graph of a first exemplary signal output by the controller to a seat control motor, in which the signal is a continuous square wave.

FIG. 5 is a graph of a first exemplary signal output by the controller to a seat control motor, in which the signal is a continuous square wave. As previously discussed, the first embodiment of the controller 34 includes a switching network configured to rapidly vary the direction of rotation of the seat control motor. Consequently, the controller 34 may output a square wave, as shown in FIG. 5. As illustrated, an x-axis 52 represents time, a y-axis 54 represents voltage, and a curve 56 represents a square wave output signal from the controller 34. Prior to providing an oscillating voltage signal to the motor, the controller 34 outputs a substantially constant voltage signal 58. For example, if the controller 34 is not driving the seat control motor to vary the position of the seat 14, the constant output signal 58 may be at substantially zero voltage. As illustrated, the controller 34 initiates seat vibration at point 60 by outputting a first voltage oscillation 62. In the illustrated embodiment, the switching network within the controller 34 first outputs a positive voltage 66 to the motor for a first time period, and then outputs a negative voltage 68 for a second time period. The total duration of this first oscillation 62 is shown as the wavelength 70. As will be appreciated, the wavelength 70 is inversely proportional to frequency. Consequently, the frequency of the vibration may be varied by altering the duration of the positive and negative voltages 66 and 68.

Because the present embodiment utilizes direct current (DC) seat control motors, applying a positive voltage will induce the motors to rotate in a first direction, while applying a negative voltage will induce the motors to rotate in the opposite direction. Consequently, the illustrated square wave 56 will cause the motors to rapidly change directions, thereby inducing a vibration within the seat 14. As previously discussed, the controller may output a frequency between approximately 1 Hz to 20,000 Hz by varying the switching frequency of the positive and negative voltages. As will be appreciated, lower vibration frequencies may be felt by the driver, while higher frequencies may produce an audible output. For example, a driver may not hear frequencies below approximately 200 Hz, but would feel such frequencies as vibrations within the seat 14. As will be further appreciated, the driver may be able to differentiate between tactilely sensed frequencies based on the experienced sensation, and audible frequencies based on the pitch. Consequently, various vehicle conditions may be communicated to the driver by varying the duration of the wavelength 70.

Furthermore, the difference between the positive voltage 66 and the negative voltage 68 establishes a peak-to-peak amplitude 72. Further information may be conveyed to the driver by varying the amplitude 72. As will be appreciated, higher amplitude signals may induce stronger vibrations within the vehicle seat 14. For example, the controller 34 may induce a vibration within the seat 14 to indicate a low fuel level. In such a configuration, the amplitude 72 may increase as fuel level decreases to alert the driver of the increased likelihood of running out of fuel. In further embodiments, the controller 34 may employ pulse modulation to generate a simulated sine wave. Specifically, the controller 34 may output a series of voltage oscillations that approximate the shape of a sine wave, thereby inducing the seat control motors to gradually transition between rotation directions.

Figure 6:
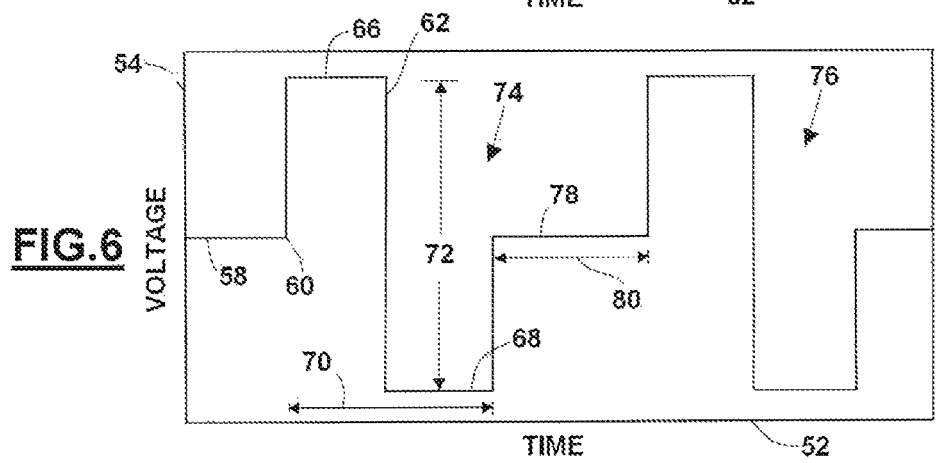
FIG. 6 is a graph of a second exemplary signal output by the controller to a seat control motor, in which the signal is a pulsed square wave.

FIG. 6 is a graph of a second exemplary signal output by the controller to a seat control motor, in which the signal is a pulsed square wave. As previously discussed, the controller 34 may establish a series of vibrating pulses within the seat 14 to indicate a particular vehicle condition. In the illustrated embodiment, the controller 34 outputs a first pulse 74 and a second pulse 76, separated by a constant voltage region 78. As illustrated, the first pulse 74 includes a single oscillation between the positive voltage 66 and the negative voltage 68. As will be appreciated, further embodiments may include additional oscillations within each pulse. The number of oscillations within each pulse and the wavelength of each oscillation establishes the duration of the pulse. After the first pulse 74 is complete, the controller 34 provides a constant (e.g., zero) voltage to the motors, as illustrated by the region 78. The duration 80 of the constant voltage region 78 establishes the delay between pulses. For example, in certain configurations, the duration of delay and the duration of each pulse may be substantially equal to establish a rhythm within the seat 14. Alternative embodiments may vary the duration of each pulse and the duration of each delay to establish other rhythms within the seat 14. The controller 34 may be configured to vary these durations to differentiate between various vehicle conditions.

Figure 7:
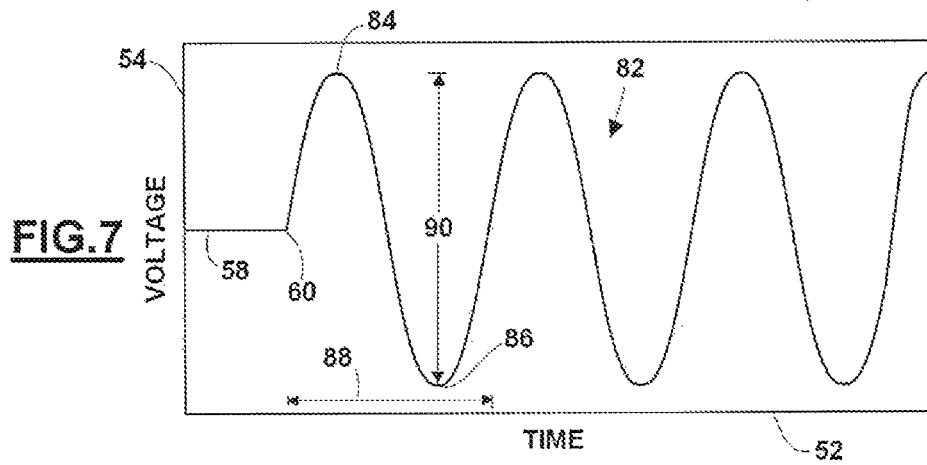
FIG. 7 is a graph of a third exemplary signal output by the controller to a seat control motor, in which the signal is a continuous sine wave.

FIG. 7 is a graph of a third exemplary signal output by the controller to a seat control motor, in which the signal is a continuous sine wave. As previously discussed, the second embodiment of the controller 46 includes a signal generator 48 and amplifier 50 configured to output an alternating current (AC) signal, such as the illustrated sine wave. As illustrated, the x-axis 52 represents time, the y-axis 54 represents voltage, and a curve 82 represents a sine wave output signal from the controller 46. As illustrated, the controller 46 initiates seat vibration at point 60 by outputting a voltage that progressively oscillates over time, thereby forming the illustrated sine wave 82. Specifically, the voltage oscillates between a maximum positive voltage 84 and a maximum negative voltage 86. The total duration of this first oscillation is shown as the wavelength 88. As will be appreciated, the wavelength 88 is inversely proportional to frequency. Consequently, the frequency of the vibration may be varied by altering the time between maximum voltages 84 and 86.

Because the present embodiment utilizes direct current (DC) seat control motors, applying a positive voltage will induce the motors to rotate in a first direction, while applying a negative voltage will induce the motors to rotate in the opposite direction. Consequently, the illustrated sine wave 82 will cause the motors to rapidly change directions, thereby inducing a vibration within the seat 14. As previously discussed, the controller may output a frequency between approximately 1 Hz to 20,000 Hz by varying the output from the signal generator 48. Consequently, various vehicle conditions may be communicated to the driver. Furthermore, the difference between the maximum positive voltage 84 and the maximum negative voltage 86 establishes a peak-to-peak amplitude 90. As previously discussed, additional information may be conveyed to the driver by varying the amplitude 90.

In further embodiments, the controller 46 may be configured to output an arbitrary waveform, such as an oscillating voltage signal having a frequency and/or amplitude that varies over time. For example, the signal generator 48 may output a series of audible and/or tactile oscillations indicative of an occupant-recognized tune. The occupant may associate this tune with a particular identified vehicle condition.

In further embodiments, the controller 46 may couple the seat control motors to a vehicle audio system. In such embodiments, the controller 46 may amplify the audio signal output from the audio system, and transmit the resultant oscillating voltages to the seat control motors, thereby inducing a vibration within the seat 14 consistent with the audio signal. In certain embodiments, the controller 46 may include a low pass filter configured to facilitate passage of low-frequency signals to the amplifier 50, while blocking high-frequency signals. For example, the low pass filter may be configured to block frequencies greater than 125 Hz. Such a configuration may enhance an audio experience by providing a tactile and/or audible output through the seat control motors. In addition, such a configuration may obviate subwoofer assemblies that may otherwise increase the weight, decrease the interior space and/or increase the cost of the vehicle 10. While the audio enhancement system is described above with reference to the controller 46 of FIG. 4, it should be appreciated that the controller 34 of FIG. 3 may be configured to receive an audio signal, approximate at least a portion of the signal (e.g., lower frequencies) using the switching network, and output a square wave signal to the seat control motors to generate the desired tactile and/or audible experience.

In certain embodiments, the controller 34 or 46 may be configured to induce a sustained vibration within the vehicle seat 14 to facilitate passenger comfort. For example, the controller 34 or 46 may induce a vibration within the seat bottom 16 to enhance circulation within the legs of an occupant. In such a configuration, the third seat control motor 26, configured to tilt the seat bottom 16 relative to the floor of the vehicle interior 12, may be driven to provide the desired vibration within the seat bottom 16. However, it should be appreciated that the controller 34 or 46 may also induce a sustained vibration within the seat 14 by driving the first seat control motor 22, the second seat control motor 24 and/or the fourth seat control motor 28. The driving frequency may be particularly selected to enhance passenger comfort and/or to increase circulation within the occupant legs. For example, the controller 34 or 46 may drive the seat control motor at a frequency lower than a perceptible range of the occupant (e.g., less than 1 Hz). Consequently, the controller 34 or 46 may increase leg circulation without the occupant noticing the vibration. Alternatively, the controller 34 or 46 may drive the seat control motor at a tactilely sensed frequency, such as between 20 Hz to 50 Hz, for example.

While only certain features and embodiments of the invention have been illustrated and described, many modifications and changes may occur to those skilled in the art (e.g., variations in sizes, dimensions, structures, shapes and proportions of the various elements, values of parameters (e.g., temperatures, pressures, etc.), mounting arrangements, use of materials, colors, orientations, etc.) without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the invention. Furthermore, in an effort to provide a concise description of the exemplary embodiments, all features of an actual implementation may not have been described (i.e., those unrelated to the presently contemplated best mode of carrying out the invention, or those unrelated to enabling the claimed invention). It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. A vehicle seating system comprising:
   a vehicle seat;
   a seat control motor coupled to the vehicle seat and configured to move the vehicle seat to an occupant-desired position and to induce a vibration within the vehicle seat;
   a controller communicatively coupled to the seat control motor, wherein the controller is configured to output a first signal to the seat control motor to induce the vibration within the vehicle seat; and
   a sensor coupled to the seat control motor, wherein the sensor is configured to measure rotational output of the seat control motor and to transmit a second signal indicative of seat position to the controller;
   wherein the controller is configured to continuously vary the first signal based on the second signal indicative of seat position to maintain the vehicle seat in a substantially constant position.

2. The vehicle seating system of claim 1, wherein the vehicle seat comprises a seat bottom and a seat back rotatably coupled to the seat bottom, and wherein the seat control motor is disposed in or beneath the seat bottom.

3. The vehicle seating system of claim 2, comprising a second seat control motor configured to translate the vehicle seat in a vertical direction, a third seat control motor configured to tilt the seat bottom relative to a floor of a vehicle interior, a fourth seat control motor configured to rotate the seat back relative to the seat bottom, or a combination thereof, wherein the seat control motor is configured to translate the vehicle seat in a longitudinal direction, and wherein the controller is coupled to more than one of the seat control motors and configured to selectively induce a vibration in each of the coupled seat control motors.

4. The vehicle seating system of claim 1, wherein the controller comprises a memory configured to store the second signal indicative of seat position, and the controller is configured to store the second signal indicative of seat position within the memory prior to outputting the second signal, to output the second signal, and to return the vehicle seat to the stored position thereafter.

5. The vehicle seating system of claim 1, wherein the controller is configured to drive the seat control motor to induce the vibration within the vehicle seat to enhance circulation within legs of an occupant.

6. The vehicle seating system of claim 1, wherein the controller comprises a signal generator and an amplifier configured to drive the seat control motor with an alternating current (AC) signal.

7. The vehicle seating system of claim 1, wherein the controller is configured to selectively vary a frequency of the first signal, to output the first signal in a series of pulses, or a combination thereof.

8. The vehicle seating system of claim 1, wherein the controller is configured to receive an audio signal from a vehicle audio system, and to drive the seat control motor to induce the vibration within the vehicle seat consistent with the audio signal.

9. A vehicle seating system comprising:
   a controller configured to adjust a position of a vehicle seat via operation of a seat control motor, wherein the controller is configured to output a signal to the seat control motor to induce a vibration within the vehicle seat, wherein the controller is configured to store an initial position of the vehicle seat, to output the signal after storing the initial position of the vehicle seat, and to return the vehicle seat to the stored initial position after outputting the signal.

10. The vehicle seating system of claim 9, wherein the controller is configured to continuously vary the signal based on a measured seat position to maintain the vehicle seat in a substantially constant position.

11. The vehicle seating system of claim 9, wherein the signal comprises a square wave.

12. The vehicle seating system of claim 9, wherein the controller is configured to selectively vary a frequency of the signal, an amplitude of the signal, or a combination thereof.

* * * * *